(No Model.)
H. GAW.
THILL COUPLING.
No. 547,637. Patented Oct. 8, 1895.
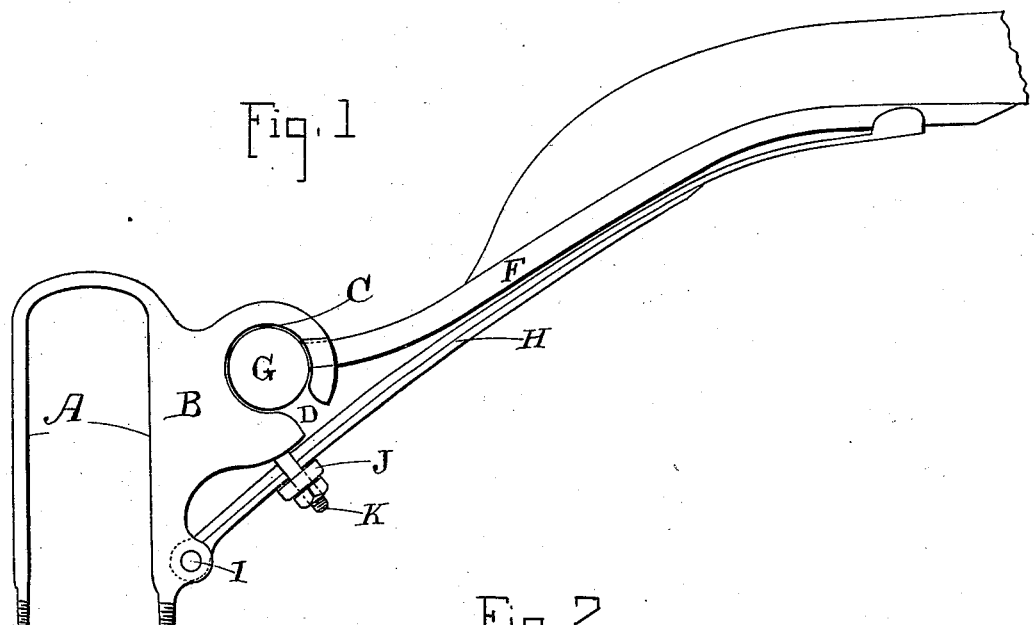
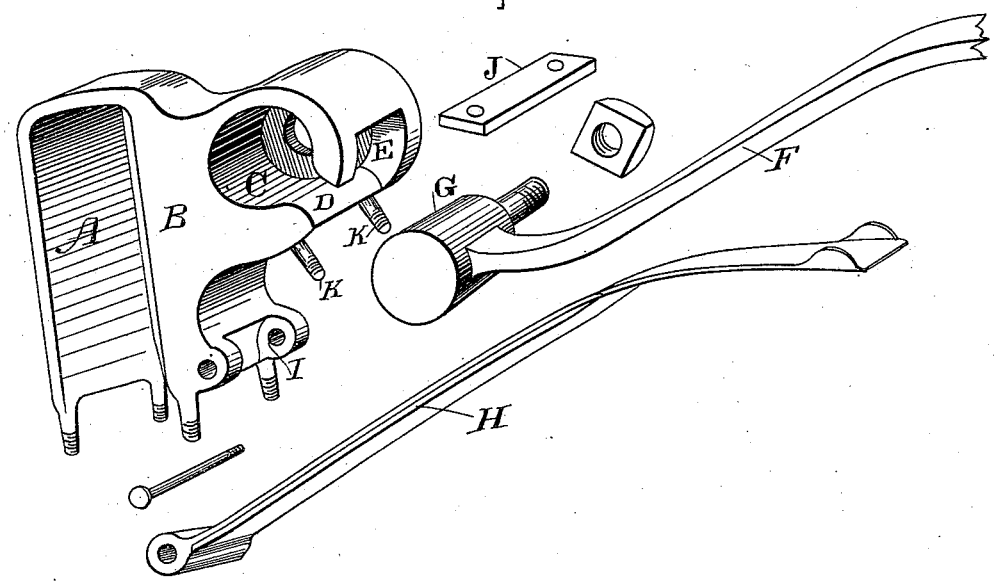

United States Patent Office.

HUGH GAW, OF SAN FRANCISCO, CALIFORNIA.

THILL-COUPLING.

SPECIFICATION forming part of Letters Patent No. 547,637, dated October 8, 1895.

Application filed February 7, 1895. Serial No. 537,637. (No model.)

*To all whom it may concern:*

Be it known that I, HUGH GAW, a subject of the Queen of Great Britain, residing in the city and county of San Francisco, State of California, have invented an Improvement in Safety Thill-Couplings; and I hereby declare the following to be a full, clear, and exact description of the same.

My invention relates to a device for securing shafts or thills to carriages.

It consists of the construction and combination of devices hereinafter described and claimed.

Figure 1 is a side elevation. Fig. 2 is a perspective view of the parts separated.

A is the clip, adapted to fit around the buggy-axle and to be secured thereto by nuts in the usual manner. The projection B at the front has a cylindrical socket C formed in it, extending through from one side, but having the opposite end closed, a slot or channel D opening out from the front lower side of this cylindrical chamber and connecting with a rectangular space E in the center of the front of the part B, and which also connects with the cylindrical interior chamber, as shown.

The shaft-iron F has a cylindrical end G formed upon it of such diameter as to readily slip into the cylindrical chamber C, and the shape of the shaft-iron at its junction with this head is such that it will slip through the slot D when coincident with it. The head and shank may thus be pushed into position, and the shank of the shaft-iron can then be turned up into the rectangular space or opening E at the front, where it will be prevented from any side movement.

A hole is made through the closed end of the cylindrical chamber C, and the cylindrical head on the shaft-iron has an extension upon that side which is adapted to pass through this hole, having screw-threads cut upon the outer end to receive a nut, which thus secures it and will prevent the head from being withdrawn from the chamber C, even though the shaft-iron be turned to coincide with the channel D. The ordinary position of the shafts when in use is, however, elevated, so that the shaft-irons lie within the rectangular openings in the front of the parts B and are prevented from being withdrawn by the sides of this chamber.

In order to retain the shaft in an elevated position, I have shown a spring H, having a pivot-pin at I, where it is attached to the axle-clip. This spring extends up beneath the shaft-iron and essentially parallel with it for a considerable distance, having lugs at its upper end upon each side of the shaft-iron where it forms contact with the latter.

J is a holder or clip fitting upon screws K, which are formed with or secured to the lower part of B and adapted to receive nuts upon their outer ends, which thus hold this clip part closely up against the spring near its hinge-point. This serves to hold the shafts up, so that they are always in position to have the horse attached to the vehicle, and it also prevents the shank of the shaft-iron from being depressed to a point opposite the side slot D, through which it is entered and removed.

Whenever it is desired to remove the thills or shafts, the holder or clip-bar J is removed, which allows the spring to drop or turn about its fulcrum-point at the lower end, and the shafts may then be depressed until the shank of the iron comes in line with the slot. The nut being then unscrewed from the threaded portion which projects through the closed end in which the head of the shaft-iron fits, the latter may be removed from the opposite side and the shafts detached from the vehicle. They are returned in the same manner, and the spring being locked in place the device is locked so that it cannot be removed.

Having thus described my invention, what I claim as new, and desire to secure by Letters Patent, is—

1. The combination, with axle clips having chambered extensions at their front, and shaft irons having cylindrical heads adapted to fit the chambers of the extensions, of springs fulcrumed to the clips below the chambers, bars or keepers engaging the springs at a point above their fulcrum points whereby the springs are clamped in place so that their upper ends form contact with the shaft irons and retain the shafts elevated so as to prevent their being disengaged.

2. The axle clips having horizontal cylindrical chambered projections at the front, closed at one end, said projections having openings leading through their front sides, with an extension of said openings into which the shaft irons are raised when the coupling is completed, the shaft irons having cylindrical heads adapted to be passed through said front openings, and to fit the cylindrical chambers, said heads having pins adapted to project through the closed ends of the chambers, means for securing said pins, springs fulcrumed to the lower front of the axle clips, bars or keepers by which they are clamped in place at a point above their fulcrum points so that the upper ends form contact with the shaft irons and retain the shafts in an elevated position so as to prevent their being disengaged.

In witness whereof I have hereunto set my hand.

HUGH GAW.

Witnesses:
S. H. NOURSE,
GEO. H. STRONG.